(No Model.)
W. DAMEREL.
FRUIT JAR.
No. 307,380. Patented Oct. 28, 1884.
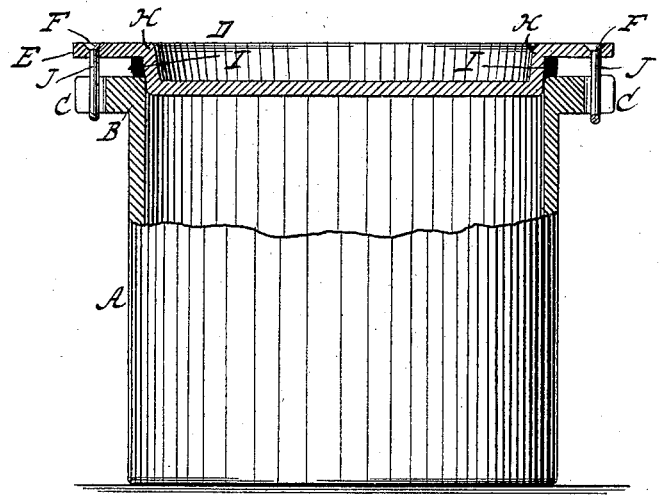
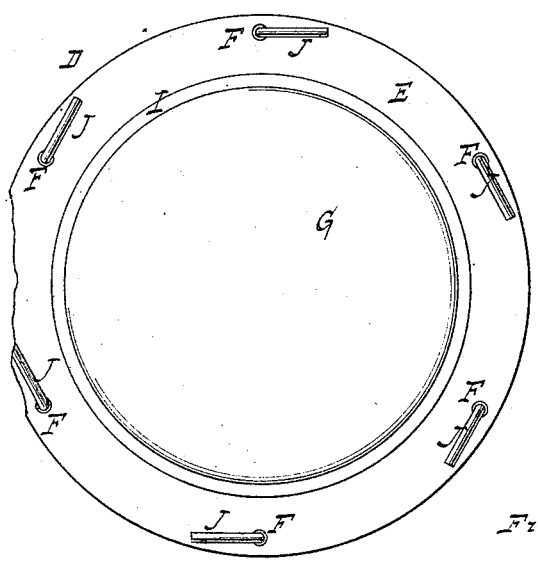
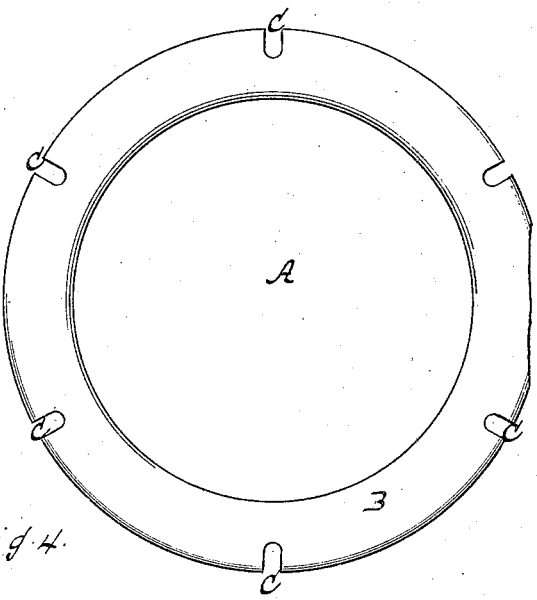
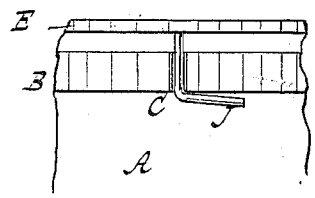
WITNESSES:
William Miller
Otto Hufeland
INVENTOR
William Damerel
BY Van Santvoord & Hauff
ATTORNEYS

UNITED STATES PATENT OFFICE.

WILLIAM DAMEREL, OF BROOKLYN, NEW YORK.

FRUIT-JAR.

SPECIFICATION forming part of Letters Patent No. 307,380, dated October 28, 1884.

Application filed July 24, 1884. (No model.)

*To all whom it may concern:*

Be it known that I, WILLIAM DAMEREL, a citizen of the United States, residing at Brooklyn, in the county of Kings and State of New York, have invented new and useful Improvements in Fruit-Jars, of which the following is a specification.

The invention is illustrated in the accompanying drawings.

Figure 1 is a vertical section through the center of a fruit-jar containing my invention. Fig. 2 is an under side view of the cover, showing the arrangement of the clamps when they are in the position shown in Figs. 2 and 4. Fig. 3 is a top view of the jar, its cover being removed. Fig. 4 represents a portion of the jar and cover and one of the clamps.

My invention relates to an improvement in closing and securing the contents of jars and other receptacles in which it may be desired to place articles that are to be preserved from exposure to the atmosphere, and my object is accomplished in such a manner as to enable one to readily open and close the jar without cutting or injuring the apparatus or the vessel or impairing its future usefulness.

The jar may be made of glass or any other material suitable for the purpose.

The upper part of the jar or vessel is provided with a horizontal flange, whose rim is provided with slots—three or more in number—that extend through the edge of the rim, and which are equidistant from each other.

The cover of the jar or vessel is so constructed that its central part may enter the mouth of the jar, while its flange extends over the flange of the jar. A rubber gasket or other suitable sealing device which will form a tight joint is interposed between the cover and the jar. The flange of this cover is provided with holes which coincide with the positions of the slots in the flange of the jar, so that the fastening devices or clamps can pass through them. The clamps consist of hooks which are detachable at pleasure from the apparatus. They are provided with heads which rest in countersinks in the holes in the cover, the hooked portions of the clamps being arranged to come against the under side of the flange of the jar, so as to fasten the jar and its cover together.

The cover of the jar can be made of iron or any other suitable material.

In carrying out my invention I construct a jar, A, of suitable material, and form around its mouth a flange, B, projecting horizontally, as shown in the drawings. This flange is to be of sufficient strength to resist the strain put upon it in closing the jar by the action of the clamps. The flange B is slotted at suitable places on its edge to receive the fastening-clamps. The slots are marked C. They are open, extending through the edge of the flange, so that the clamps can be placed in them easily notwithstanding the hooked form of the clamps.

The cover D of the jar is made of any suitable material that is sufficiently rigid for the purpose required. It is provided with a flange, E, which, when the cover is placed on the jar, extends over the flange of the jar and is parallel to it, the upper surface of the flange of the jar and the under surface of the flange of the cover being so made and arranged that they will, in combination with a rubber gasket or other suitable packing interposed between them, form a tight joint which shall effectually seal or close the mouth of the jar. The flange E of the cover is provided with countersunk holes F at suitable points, corresponding with the slots C in the flange of the jar. The central part of the cover is depressed below the level of its flange, so that its depressed part G can fit in the mouth of the jar. The side H of the cover between the part or body G is made tapering, so that as it is forced into the jar it will have a tendency to make a close joint at the mouth of the jar, and so that the rubber gasket or packing will be enabled to act with good effect. The rubber gasket I is placed around the tapering side H of the cover, and its natural action is to adjust itself to the same, and when the cover is drawn down upon the jar the packing will remain close to the side of the cover and effectively close the joint. The clamps J are L-shaped hooks of metal or other suitable rigid material, made with heads which fit in the countersunk holes F of the cover. When the cover is placed upon the jar, and it is desired to close and fasten it thereon, it is pressed or drawn down close to the flange of the jar by a suitable wrench or other means, and in such a manner that the holes F of the cover, or some of them, coincide with some of the slots in the flange of the jar, and when the parts are in that position the hooked ends of the clamps J are inserted through the holes F and slots C, the hooks pointing outward from the jar, and are then turned upon their heads, so as to bring their hooks under the flange of the jar and into the positions shown in Figs. 1, 2, and 4. The number of holes in the flange of the cover and the number of slots in the flange of the jar may be greater or less than here shown, according to the size of the jar or other circumstances. The shanks of the clamps should be of such a length as to make it necessary to use considerable pressure to bring the cover and jar sufficiently close together to enable one to turn the horizontal portions of the clamps under the flange of the jar.

Among the advantages secured by my invention I may state that I attain thereby a simply constructed and operated air-tight jar without the application of any sealing substance or material, and that the jar can be quickly and easily opened and closed without impairing it in its cover or fastening devices.

By forming notches in the opposite sides of the cover, a string or wire bail may be adapted to form a convenient handle for the jar.

What I claim as new, and desire to secure by Letters Patent, is—

A fruit-jar or preserving-vessel provided with a slotted flange, B, substantially as described, in combination with the cover D, provided with countersunk holes F, and with the fastening-clamps J, substantially as described.

In testimony whereof I have hereunto set my hand and seal in the presence of two subscribing witnesses.

WILLIAM DAMEREL. [L. S.]

Witnesses:
GIDEON A. NICHOLS,
WILLIAM A. ROWLAND.